United States Patent [19]
Labouchere

[11] Patent Number: 5,913,493
[45] Date of Patent: Jun. 22, 1999

[54] SEAPLANE HULL

[75] Inventor: James Labouchere, Milford-On-Sea, United Kingdom

[73] Assignee: Warrior (Aero-Marine) Ltd., Hampshire, United Kingdom

[21] Appl. No.: 08/750,882

[22] PCT Filed: Jun. 16, 1995

[86] PCT No.: PCT/GB95/01410

§ 371 Date: Dec. 17, 1996

§ 102(e) Date: Dec. 17, 1996

[87] PCT Pub. No.: WO95/35236

PCT Pub. Date: Dec. 28, 1995

[51] Int. Cl.$^6$ .................................................. B64C 35/02
[52] U.S. Cl. ........................................... 244/105; 244/106
[58] Field of Search ...................................... 244/105, 106; 114/56, 291, 272

[56] References Cited

U.S. PATENT DOCUMENTS

| | | |
|---|---|---|
| 1,537,973 | 5/1925 | Uppercu . |
| 1,728,621 | 9/1929 | Martin . |
| 2,364,845 | 12/1944 | Glen . |
| 3,599,903 | 8/1971 | Handler ..................................... 244/13 |
| 4,224,889 | 9/1980 | Spiegel ...................................... 114/39 |
| 4,799,630 | 1/1989 | Richards .................................. 244/101 |
| 5,231,945 | 8/1993 | Ackerbloom ............................. 114/56 |

FOREIGN PATENT DOCUMENTS

| | | |
|---|---|---|
| 2413659 | 2/1975 | Germany .............................. 244/106 |
| 2642868 A1 | 3/1978 | Germany . |
| 243898 | 12/1925 | United Kingdom . |
| 269566 | 10/1927 | United Kingdom . |
| 565692 | 11/1944 | United Kingdom . |
| 643729 | 9/1950 | United Kingdom . |
| 668127 | 3/1952 | United Kingdom . |
| 1296679 | 11/1972 | United Kingdom . |

*Primary Examiner*—Charles T. Jordan
*Assistant Examiner*—Tien Dinh
*Attorney, Agent, or Firm*—Sheridan Ross P.C.

[57] ABSTRACT

A seaplane hull which in one embodiment has a high length to beam ration, substantially fair topside waterlines from bow to stern and a fine bow entry angle is disclosed. These characteristics minimize dispersement of the water, offering the low wave-making drag characteristics which enable high speeds without requiring planing lift. Chines on the underside describe a slim planing surface where edges converge aft toward a central plane. The slim planing surface minimizes wetted area at speed, and low pressure hollows, provided immediately above the chines, allow for air to travel aft and under an afterbody when at speed. The design enables continuity of aerodynamic and hydrodynamic streamlines throughout acceleration to take-off speed.

13 Claims, 8 Drawing Sheets

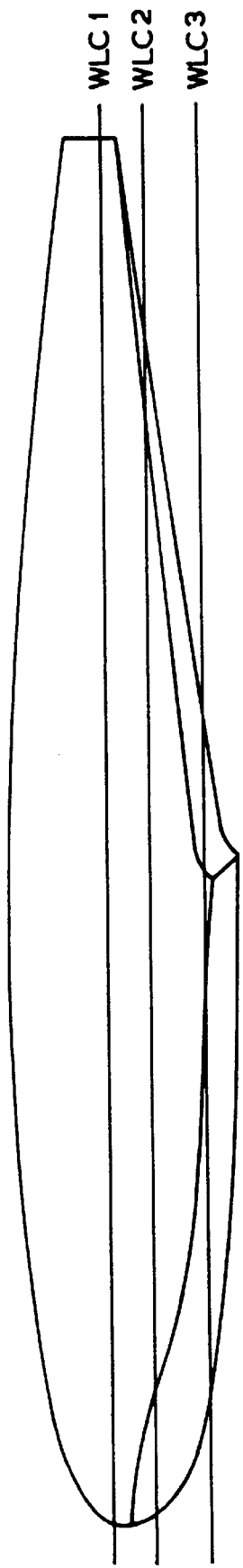
FIG.1B
FIG.1A

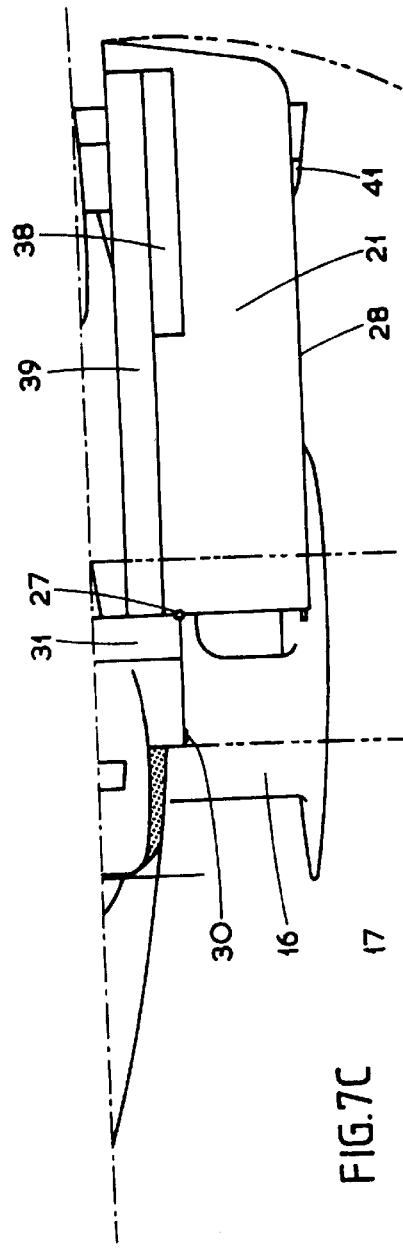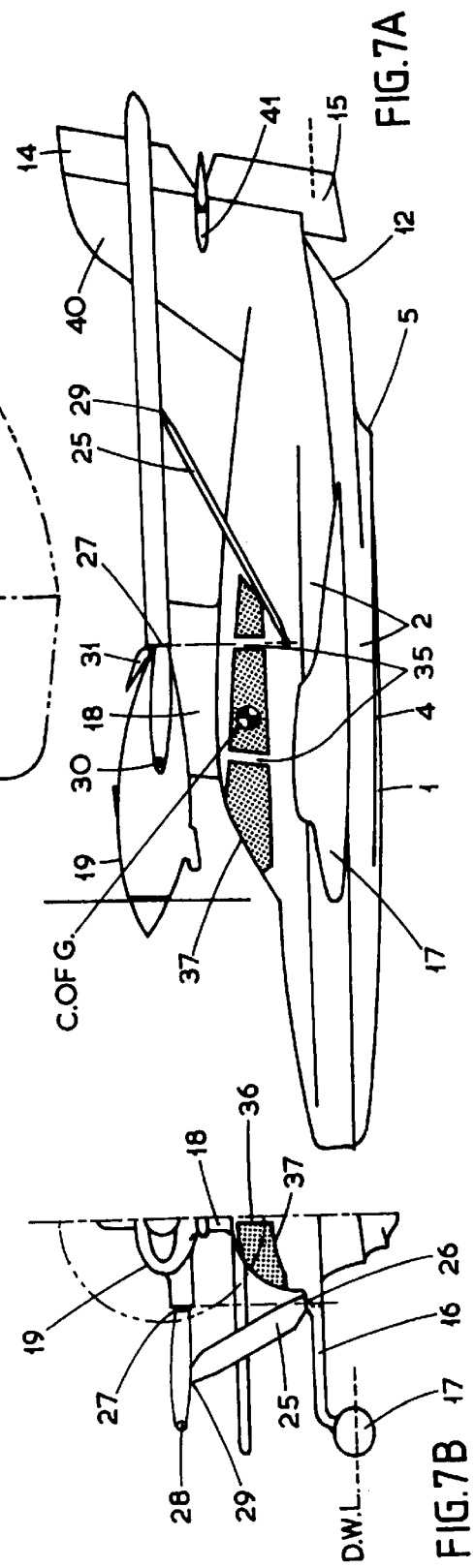

SEAPLANE HULL

This invention relates to a seaplane hull and particularly to the form thereof.

By seaplane hull is meant an integral part of the fuselage of a flying boat or the floats on a floatplane. The design criteria of sponsons or floats mounted outboard on a flying boat which, arising from their displacement, commonly provide flying boats with lateral static stability, contrasts to the design criteria for seaplane hulls and this invention does not necessarily relate to their design.

Since the inception of seaplanes, hull development has revolved around the planing hull concept, so much so that the hydrodynamic form to achieve efficiency when in displacement mode, that is to say below planing speed, has been generally ignored. By combining aspects of design established in racing catamarans and passenger catamaran ferries and innovating to enable such hulls to achieve seaplane design criteria, a new, highly original and advantageous seaplane hull has now been developed.

In plan form, conventional hulls almost universally have a resemblance to an elongated rain-drop with a rounded bow and an afterbody trailing to a point. Though this form is aerodynamically very efficient, it is wholly unsuited to motion on the surface of water. It creates a large bow-wave which creates high drag, and the Coanda effect draws it powerfully down into the water preventing it from taking-off in addition to creating a powerful nose-up pitching tendency. This is in contrast to the comparatively sharp bows and fine bow entry angles of recent catamarans.

The object of conventional seaplane hull design has been to minimise these hydrodynamic penalties while incurring as mild structural and aerodynamic penalties as possible. To prevent the Coanda effect sucking the hull down into the water, hulls are generally fitted with a transverse abrupt "step" below the centre of gravity of the seaplane to separate the water flow from the hull. To enable them to climb over the bow wave, they feature hard edged forebody chines and powerful planing surfaces from the bow back to the step. The said forebody chines and the step are angled steeply across hydrodynamic and aerodynamic streamlines and create substantial vortices which both damage directional stability and create substantial drag. The result is undesirable qualities from the point of view of hydrodynamic loading and hydrodynamic resistance during take-off. They demand an aircraft with high power-to-weight ratio and result in limited payload capacity for a given size of aircraft.

Variable geometry hulls, hydrofoils, air blowing and other devices have been used to try and maintain a clean aerodynamic hull form. However, they all have limitations and add considerably to the weight and complexity of an aircraft. None of these attempted solutions have proved Certifiable and/or commercially viable though various ideas have been tested in prototype and experimental form.

Some improvements however have been demonstrated by the use of high length-to-beam ratio hulls and this was researched in some depth prior to 1950 and is well reported in "Development of High-speed Water-based Aircraft", by Earnest G Stout in the Journal of the Aeronautical Sciences Vol. 17 August 1950. This discusses tests on hulls with length/beam ratios of up to 12 though the advantages indicated were little exploited as there has since been little seaplane development work. The U.S. Navy's flying boat XP5Y-1 (first flown in 1950) had a length/beam ratio of 10. However, it had all the above-mentioned features of a conventional seaplane.

The top speeds of offshore racing multihulls and passenger catamarans approximately doubled in the 25 years to 1994. These hulls have also demonstrated major sea-keeping advantages, but despite the demonstration of the advantages of this type of hull, no seaplane has incorporated this type of design. The appropriate use of these types of hull for seaplanes is not obvious as there are two potentially problematic factors in their application to seaplanes. Firstly, they have a large wetted surface area at high speed which results in high frictional drag when approaching take-off speed. Secondly, there appears to be a widespread assumption amongst aircraft designers that the Coanda effect remains problematic on any hull without a central step.

Patent Specification U.S. Pat. No. 3,599,903 discloses a seaplane with a hull with a high length to beam ratio of approximately 15:1, utilising hydrodynamic lifting means in the form of a hydrofoil or hydroski, the hull being said to resemble the general series of high length/beam ratio hulls developed by NACA or to be a streamlined body of revolution with longitudinal steps or strips and possibly incorporating a shallow step just forward of the CG.

According to the invention there is provided a hull of a seaplane which can be partially immersed in water and is able to take off from water, the hull having an underside formed as a planing surface defined at each side by a chine; and a length dimension from a bow of the hull to the aftermost edge of the underside more than seven times the maximum width of the narrowest waterline above the chines;

characterised in that any waterline likely to be encountered in operation and positioned a distance equal to not less than one tenth the maximum beam of the planing surface above the chines has a bow entry angle in plan form, except at and immediately proximate the bow, of less than twenty four degrees.

Preferably each chine, viewed in bodyplan section, has a radius of curvature less than 25% of the maximum width of the underside, the chine distinguishing the planing surface forming the underside from a topside thereabove.

Advantageously the beam of the underside at any station more than 80% of hull length aft of the bow is less than 20% of its maximum beam.

Preferably, viewed in profile, a plane containing a waterline which is parallel to the chine at a station common to the seaplane centre of gravity and passing through a position not more than 20% of the maximum beam of the underside higher than either the forwardmost extremity of the chines or, if the chines extend forward of a station 20% of hull length from the bow, through the intersection of the chine with said station 20% of hull length aft of the bow, has that waterline WL1 fair from any position within 5% of hull length of its forwardmost extremity to a station common to the centre of gravity of the seaplane.

Advantageously any section of said fair waterline of a length equal to 3% of hull length and located between 10% and 50% of hull length from the forwardmost extremity of that waterline, has less than a 5° change in mean direction over that section.

Preferably any waterline aft of the centre of gravity converges toward the central plane, is fair having no discontinuity or abrupt angle or edge along its whole length formed by chine, edge or other structure and wherein the aftermost extremity is forward of the aftermost extremity of any waterline thereabove.

The aftermost extremity of the underside is preferably forward of a station 80% of hull length aft of the bow.

Advantageously any waterline has a radius of curvature at its forwardmost extremity viewed in planform of less than 2% of hull length.

Preferably any waterline has a radius of curvature, at any station between 10% and 50% of hull length measured from the bow of not less than half the length of the hull.

Advantageously a concave hollow is provided above each chine and is formed by a curved or angled face.

Preferably the forwardmost extremity of each chine is at a station not more than 10% of hull length aft of the bow and wherein forward of this station, the topside and hull underside are faired together so that neither chine nor edge distinguishes topside from hull underside.

Thus the hull has a high length-to-beam ratio and a fine bow. In planform, the bow proximates to a fine wedge and the waterlines are preferably fair with large radii of curvature over the forward 50% of hull length. When the hull is level but submerged to its mean static waterline, the waterlines above the underside of the hull extend from proximate the bow to aft of the centre of gravity and a main planing surface, and these are fair throughout their length.

This fine entry angle enables the hull to slice the water without the creation of a significant bow-wave and to reach a considerable speed before residuary drag (wave-making) and skin friction prevent further acceleration. By this speed, a seaplane can carry a substantial proportion of the weight aerodynamically, such that any hydrodynamic lift required for planing can be provided by the planing surface being relatively small and elegant. In combination, these forces lift the hull to cause it to start to plane at higher speed than is conventional, then substantially reducing the wetted area for low frictional drag for the latter part of an acceleration.

To reduce the wetted area further, the planing surface preferably finishes forward of the transom or stern. This is achieved by the lateral chines defining the planing surface finishing on the central plane substantially forward of the stern. The chines substantially define a plane (i.e. two dimensions) and their effectiveness is not necessarily dependent on them being fair or continuous. It is however advantageous if the waterlines immediately above these chines are fair for hydrodynamic performance in displacement mode (at low speed) and for reducing aerodynamic drag in cruise.

The chines are designed to encourage ventilation under (i.e. separation of water flow from) the afterbody aft of the main planing surface. This is achieved by encouraging hydrodynamic vortices in the water above the chines when these chines are set at an incidence to the hydrodynamic streamlines. These vortices draw channels of air along the upper side of the chines and aft on to the underside of the hull aft of the planing surface. This separates water from the afterbody which reduces wetted surface area and drag at speed and prevents the Coanda effect pulling the afterbody down.

The finishing of any waterlines at an aft transom or stern stemline is not critical in design as the airflow so far aft tends to be turbulent (the boundary layer having broken down) irrespective of the fairness of streamlines. A mild abrupt transom at the stern may be advantageous for structural or stowage purposes and will affect the performance little.

This hull shape enables continuity of all aerodynamic and hydrodynamic streamlines to be maintained but the configuration of surfaces can still be optimised for handling and performance criteria. This is not achieved by other previously proposed seaplane hulls which have forebody chines, step or afterbody chines breaking waterlines and aerodynamic streamlines. There is no requirement for mechanical or other device to enable acceleration to take-off speed and release from the water.

The invention is diagrammatically illustrated by way of example in the accompanying drawings, in which:

FIGS. 1A and 1B show respectively a plan and a profile of an example of hull shape conventionally used by seaplanes with their predominant features;

FIGS. 7A, 7B and 7C show respectively a side elevation, a half front elevation and a half plan view of a flying boat having a hull according to the invention.

In this specification the following definitions apply.

Fair
Continuous and regular curve (though the radius of curvature may change along the curve)

Streamline
The contour that a particle of air or water follows in relation to the hull (commonly described by a longitudinal section)

Waterline
The level on the hull of a vessel to which the surface of the water comes when it is afloat or lines parallel thereto. The waterlines are assumed to be substantially parallel to the plane defined by the chines on the edges of the underside of the hull directly below the centre of gravity of the aircraft.

Bodyplan sections
Viewed parallel to the longitudinal axis the cross-sections of the outer skin of the hull Bow
The station containing the forward most extremity of any waterline Stern
The station containing the aftermost extremity of any waterline Hull length
Distance from bow to stern at any waterline Length/beam ratio
The ratio of overall hull length at the static waterline to the maximum beam of the planing surface on the underside of the hull.

As shown in FIGS. 1A and 1B a conventional seaplane has a hull with an elongated teardrop shape, a length to breadth ratio of about seven and a broad planing surface on the underside finishes at its aft end in a substantially full hull width step. Hard chines cross the streamlines WLC1, WLC2 and WLC3 of the hull.

Figure 4:
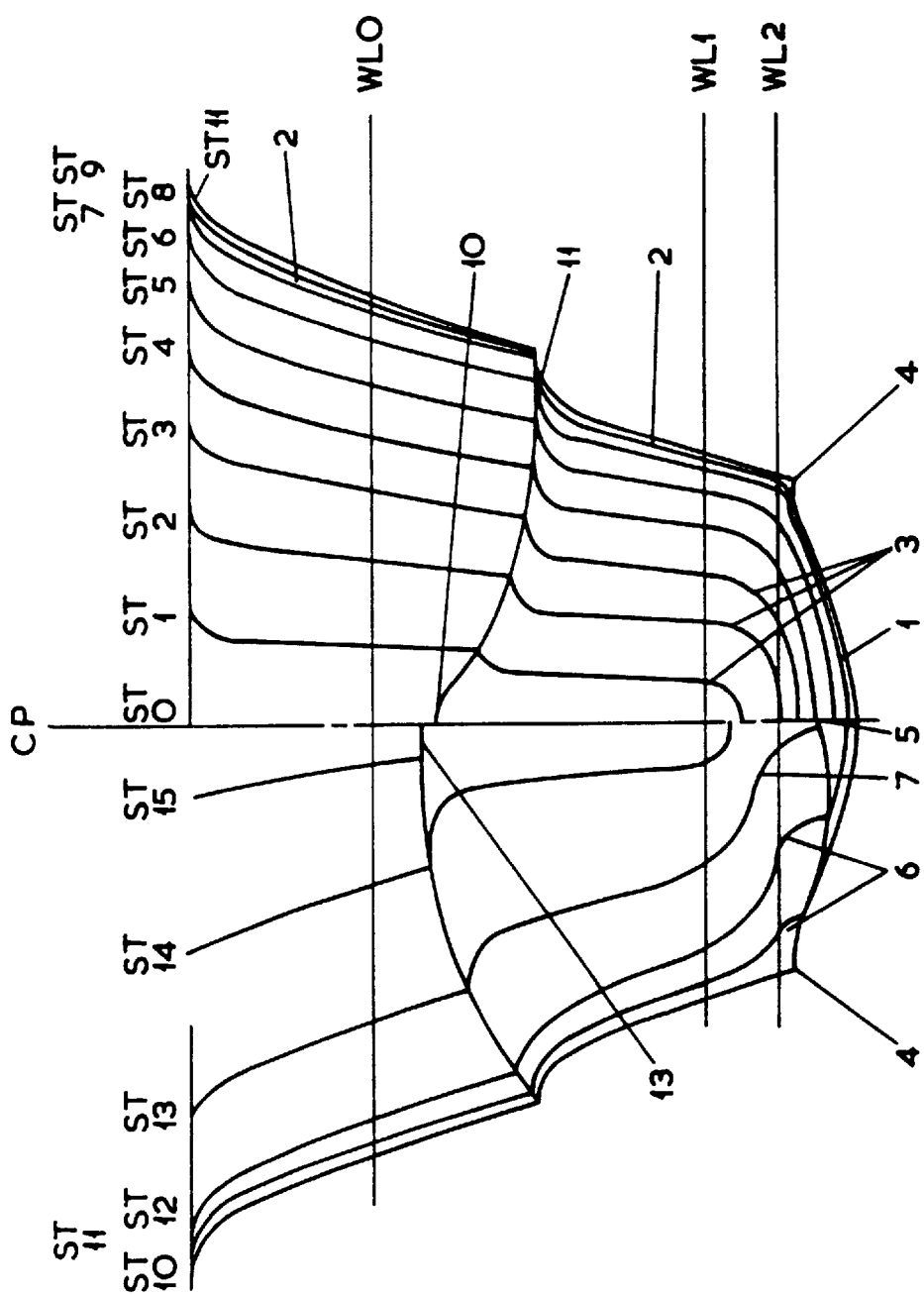
FIG. 4 shows the equidistant bodyplan sections of the hull of FIG. 3 superposed.
Figure 5:
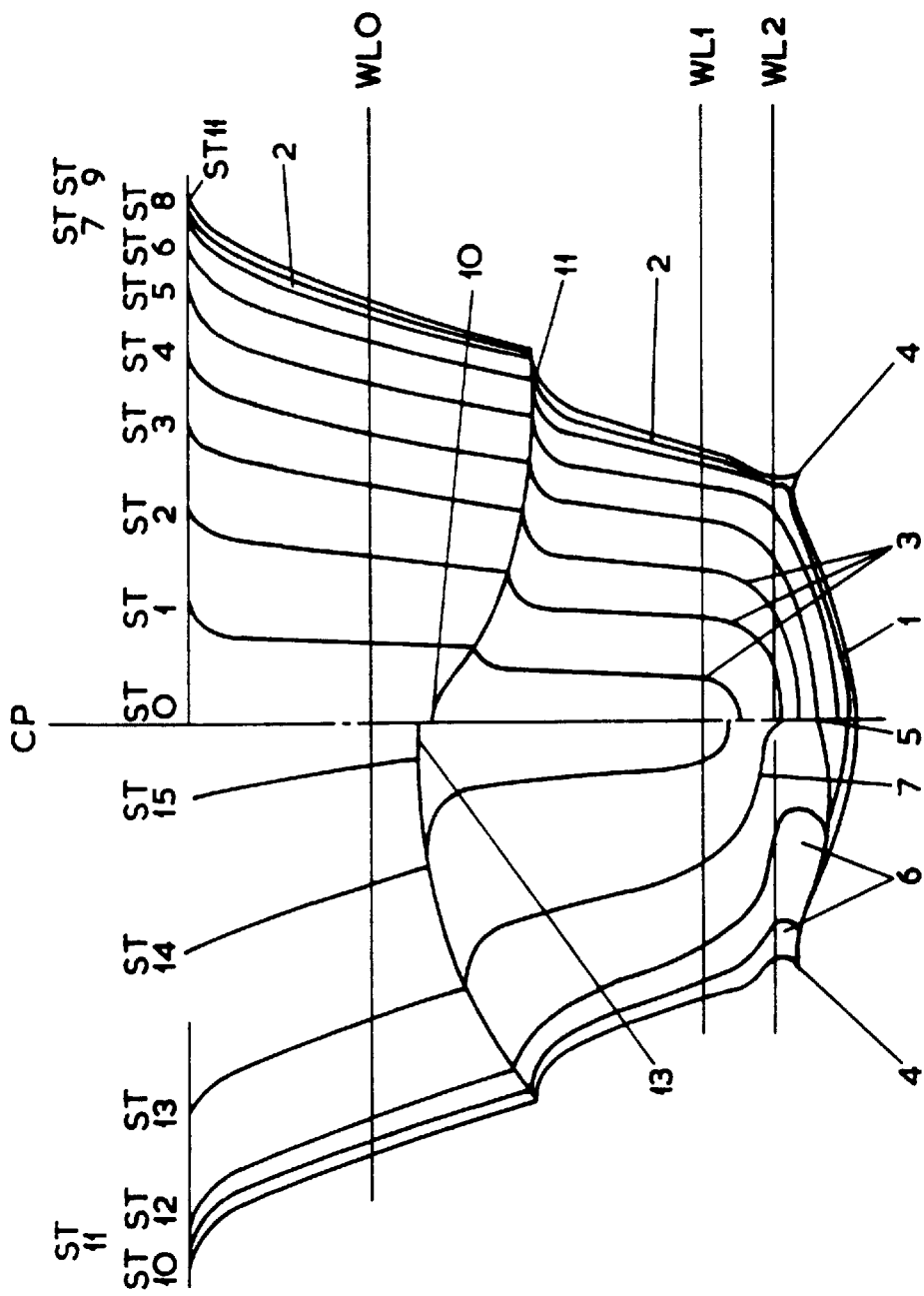
FIG. 5 shows a second embodiment of the bodyplan sections of a seaplane hull with hollows extended forward and also defines two waterlines.
Figure 6:
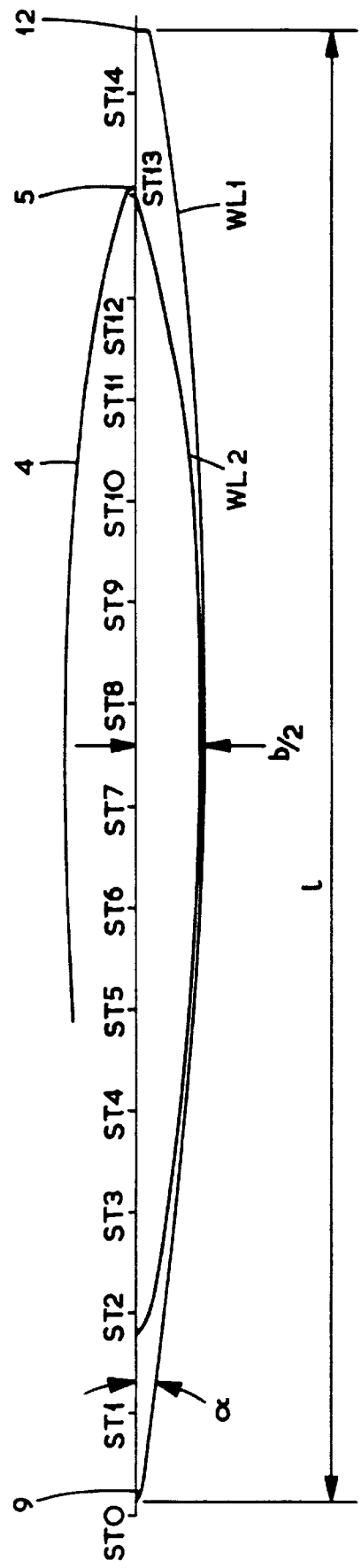
FIG. 6 shows in plan view chines defining the planing surface on the underside of the hull and the two waterlines shown in FIG. 4.

Referring to FIGS. 2 to 8 and initially to FIGS. 1 to 4, a seaplane hull comprises a hull underside 1 and a topside 2 at each side. It has a high length l to beam b ratio as shown in FIG. 6 of over ten, and viewed in planform a waterline WL1 along the topside (above the hull underside) has a large average radius of curvature. Between 4% and 50% of the hull length l from a bow 9 this radius of curvature is not less than twice the hull length. The waterline WL1 is fair and continuous and extends from the bow 9 to a stern stemline 12. Assuming a length/beam (l/b), ratio of twelve and a constant curvature from bow to stern, this results in a radius of curvature of over three times the hull length l and an angle $\alpha$ between the waterline WL1 and the central plane CP at the bow of 9.52°. The bow entry angle in plan form (which is defined herein as twice the angle $\alpha$) is less than 24° for any waterline (e.g., WL0, WL1 or WL2) likely to be encountered in operation (except immediately proximate the bow) and positioned a distance one tenth the maximum beam of the planing surface above the chines or more.

Viewed in planform the stemline of the bow 9 is formed by a hard edge or a radius of less than 0.5% of the hull length. Referring to FIG. 5 and FIG. 6 the waterline WL1 is fair from the radius at the bow stemline 9 to the stern 12. Waterline WL2 (vertically between chines 4 forming the planing surface and WL1) is fair from proximate the bow 9 to finish on the central plane substantially forward of the stern stemline 12.

Over sections at the bow, as can be seen at stations ST1, ST2 and ST3, the surfaces forming the hull underside 1 and topsides 2 are faired together, resulting in a section with substantially rounded lower edges 3.

Aft of the bow sections i.e. aft from station ST4, the lateral extremities of the hull underside 1 become increasingly pronounced, developing into the hard edged chines 4 through the midbody sections of the hull (at stations ST7 to ST10). Where these chines 4 are pronounced they define the lateral extremities of the underside 1 and the lower extremities of the topsides 2.

The edges of the port and starboard chines 4 extend aft and toward the central plane, forming a tail 5. The planform of this tail is not critical, and can take the form of a V U or W (as demonstrated by many windsurfers). The tail 5 is located substantially forward of the stern extremity of the hull ie. the stern stemline 12. The section of the topsides 2 adjacent and immediately above the chines 4 is cambered, that is to say recessed forming a hollow 6. As the hull accelerates, low hydrodynamic pressure in the hollow 6 draws air along it, the air spreading across the underside of an afterbody 7.

A planing surface formed on the hull underside 1 over the length of the chines 4 comprises one or more concave curves spanning between the chines. The depth of these at any position along the hull does not exceed 20% of the beam b. Referring to FIG. 4, double concave curves form an edge on the central plane CP which is exaggerated toward the trailing edge to form a skeg 8, FIG. 2, which adds to the directional stability of the hull. In profile, the underside of the planing surface is longitudinally substantially straight to prevent the Coanda effect creating a low pressure area and to prevent hydrodynamic pitch instability.

A spray dam 10 is located on the bow stemline 9 protruding forward of the bow stemline. This spray dam continues aft of the bow to form a lengthways knuckle 11 which continues over the length of the hull. The knuckle consists of a hard edge and the topside 2 is cambered and flared upward and outward to the knuckle edge.

Where the port and starboard knuckles 11 coincide immediately above the stern stemline, this forms an inverted flat 13 across the central plane.

Figure 2:
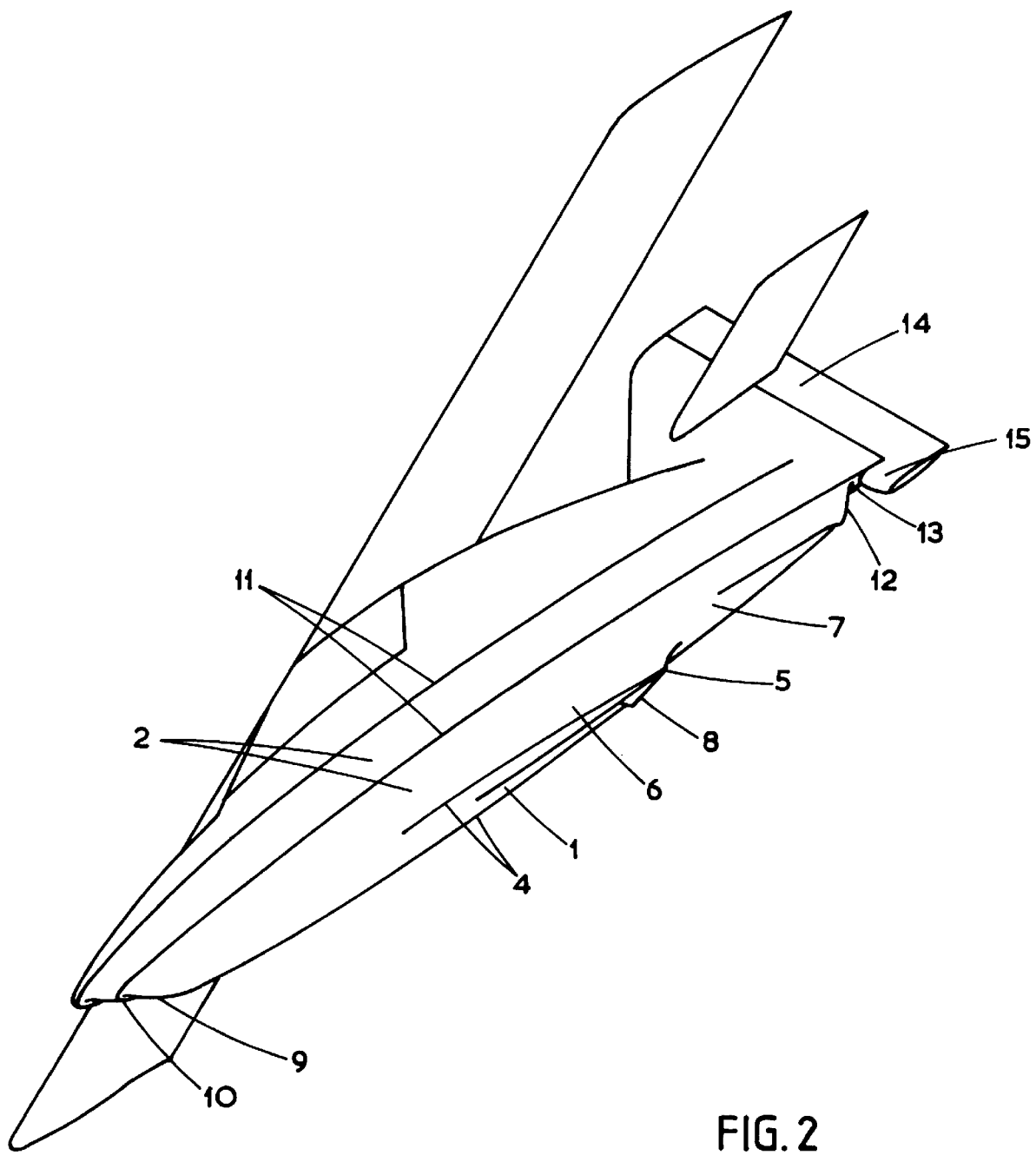
FIG. 2 shows in perspective from underneath an embodiment of a seaplane hull according to the invention, incorporated into an aircraft configuration.
Figure 3:
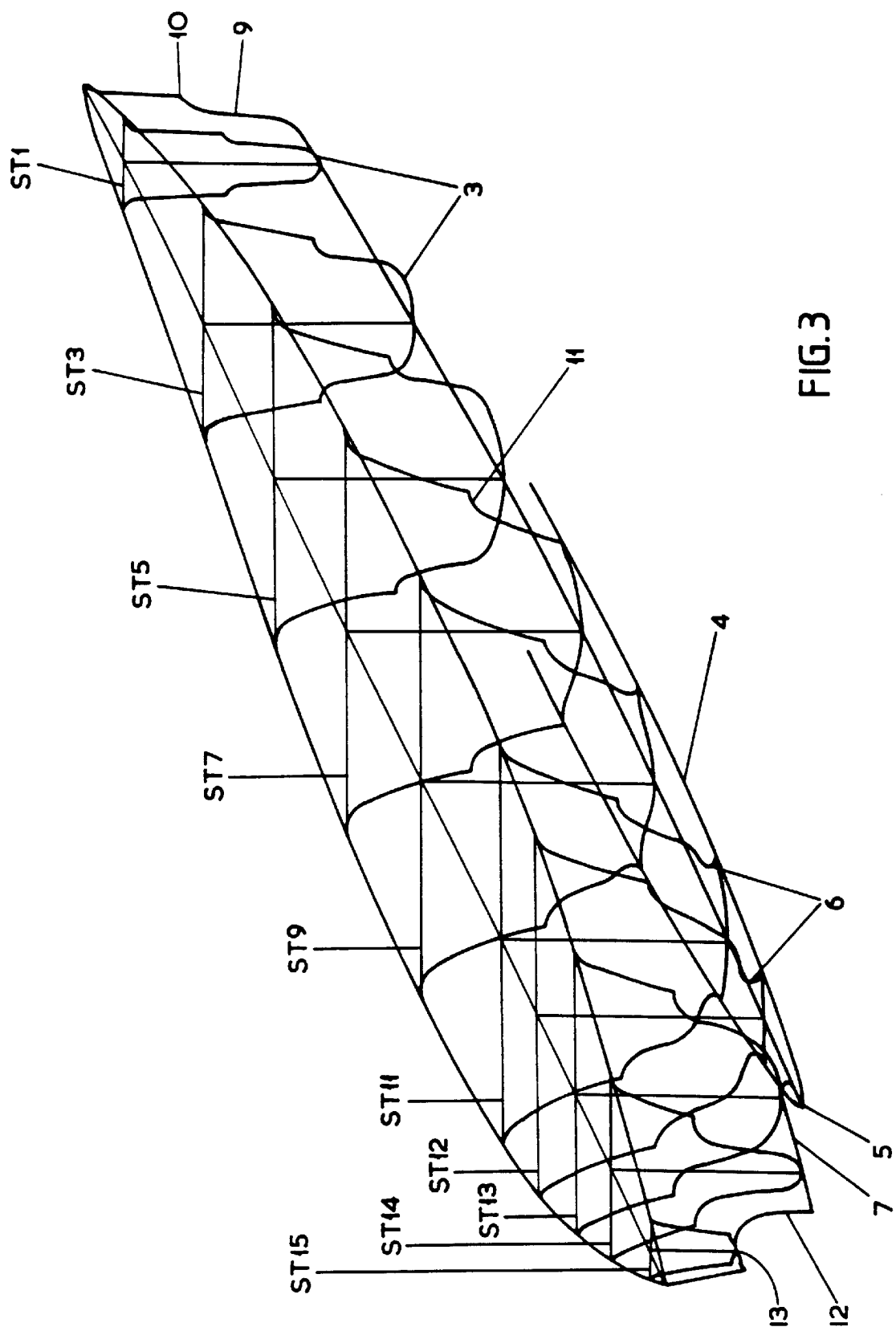
FIG. 3 shows in perspective a diagram of the outlines of equidistant bodyplan sections numbered sequentially from the bow to the stern and the edges of the main planing surface of a seaplane hull according to the invention.

An air rudder 14, FIG. 2, is mounted on a hinge line above the convergence of the knuckles 11. The rudder extends to below the flat 13 thereby forming a water rudder 15. The leading edge of the rudder is forward of the rudder hinge line and aft of the stern stemline 12.

From the bodyplans of FIG. 4 and FIG. 5 it can be seen that the topsides of the hull incorporate two knuckles on each side. These and the outward flare of the topsides maximise displacement volume for a given draught, and incorporated into a flying boat can provide a broad and voluminous fuselage.

FIGS. 4 and 5 show three waterlines WL0, WL1 and WL2. WL0 is a static waterline the position of which will vary with loading of the seaplane. WL1 is the likely operational waterline at half to two thirds of take-off speed. WL2 is the likely operational waterline at 90% of take-off speed.

Referring to FIGS. 7A to 7C, protruding from the higher of the two knuckles is a laterally extending stub wing 16 to which is attached a sponson 17. The underside of the stub wing 16 and the underside of the higher knuckle 11 are faired together to form a substantially continuous surface. The buoyancy of the sponson provides lateral stability when the aircraft is static and also has a chined underside which provides planing lift at speed. When the aircraft is loaded to its maximum and the aircraft is level and submerged to its loaded static waterline, each sponson 17 displaces approximately half its own volume. The outer edge of the sponsons are reinforced and padded for berthing against hard surfaces (i.e. jetties). The stub wing 16 serves as a walkway for passengers and crew to gain access to the fuselage.

Figure 8:
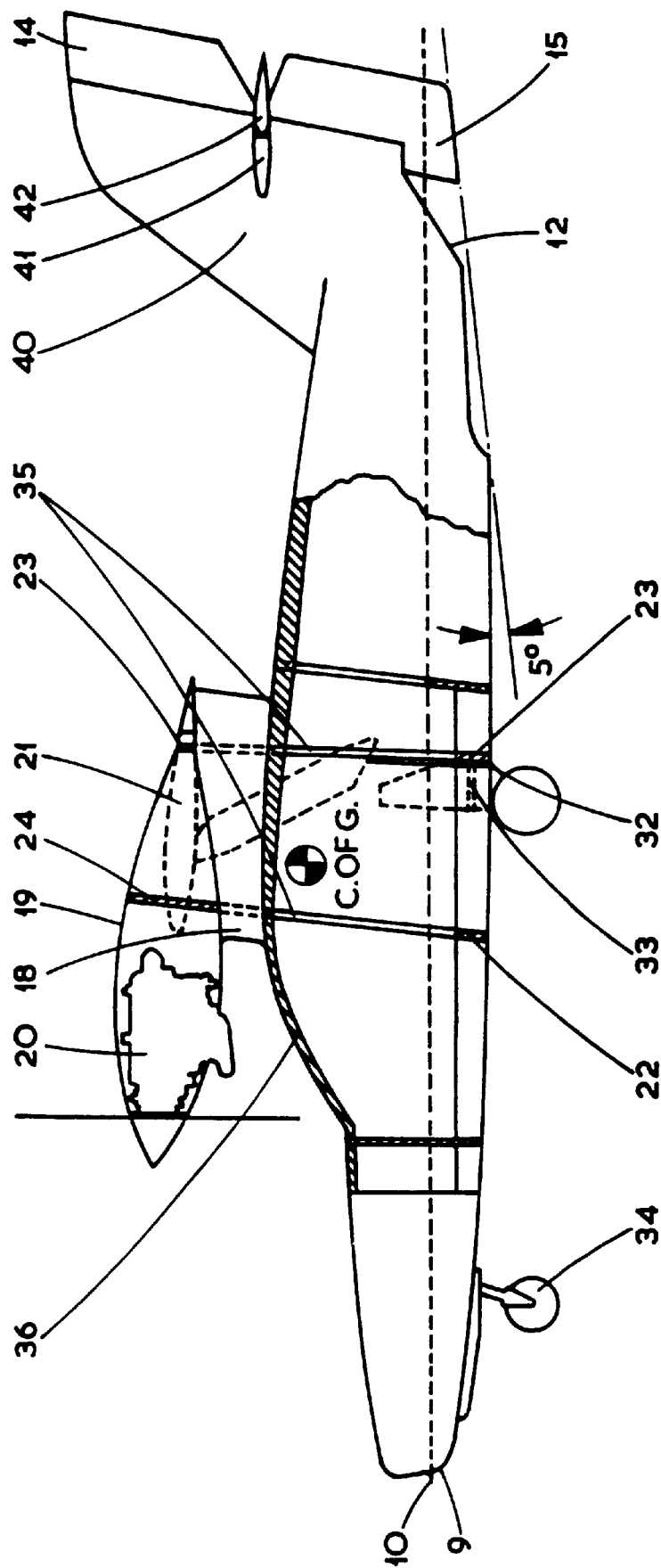
FIG. 8 shows a profile section of the flying boat of FIG. 7.

Protruding from the top of the fuselage is a mast 18 to which a nacelle 19 is attached. An engine 20 is mounted in the front of this nacelle 19 and the main wings 21 are attached laterally. To transmit loads between the nacelle 19 and the fuselage, ring frames 22, 23, FIG. 8, are bonded into the fuselage and extend upward through the mast 18 to the nacelle 19, forming a continuous frame or bulkhead in both. The forward ring frame 22 forms a firewall 24 behind the engine 20. The use of the two ring frames 22, 23 displaced longitudinally imparts strength and rigidity in all axes between the fuselage and the nacelle 19.

A strut 25 is attached at one end to a pivoting attachment 26 on the side of the fuselage. The pivoting axis of this attachment 26 is common to a hinge attachment 27 of the wing 21 to the nacelle 19 and is typically at 70% of wing chord from the wing leading edge 28. The opposite end of the strut 25 is attached rigidly to a locator 29 outboard on the wing 21, thus bracing the wing to carry flying loads and alleviating the hinged wing attachment 27 of bending (cantilever) loads. The leading edge of the wing is detachably fixed in a socket 30 in wing fairings forming part of the structure of the nacelle 19. A retractable flap 31 extends across the trailing edge of the nacelle 19. This inboard flap assembly 31 can be hinged upward and this enables the wing to rotate aft by a full 90 degrees. This brings the leading edges 28 of the wings 21 to lie within the beam defined by the outer edges of the sponsons 17.

A frame 32 to which the hinged strut 25 attachment to the fuselage connects accommodates the loads of a main undercarriage 33. A nose wheel 34 is provided at the front of the fuselage.

Frames of side canopies 35 locate forward and aft in the structure formed by the ring frames 22,23. A central structural member 36 extending down the centre of the front cockpit provides the hinge attachment of port and starboard front canopies 37. When these are open they form a substantial shield immediately behind the propeller (not illustrated) protecting any occupants from the risk of making contact with the propeller for example when mooring.

Aerodynamic roll control is achieved conventionally using either or both spoilers and ailerons 38. To achieve maximum lift coefficient, the ailerons 38 droop simultaneously with the extension of the flaps 31 and flaps 39 while still retaining a differential control facility, thus forming "drooperons".

A tail fin 40, the air rudder 14, a tailplane 41 and an elevator 42 are all conventional. The tailplane 41 is mounted in the wash (i.e. slipstream) of the engine propeller to provide a positive and powerful pitch control facility during take-off independent of the airspeed of the aircraft.

Referring to FIG. 8, the lowest edge of any fixed part of the water rudder 15 is above a line which passes through the aftermost edge of the tail and makes an angle to the plane described by the chines 4 below the C of G of 5 degrees. This enables the aircraft to rotate for take-off without the water rudder 15 penetrating the water at take-off speed. The water rudder is thus intended only to be effective at displacement speeds.

The lift characteristics of the flaps 31,39 (designated by flap-chord, type and angle of deflection) are adjusted so that the nose down (negative) pitching moment created by flap deflection is compensated by the resulting negative lift on the tailplane caused by the downwash aft of the wing and flap creating an equal and opposite (positive) pitching moment. The geometry and rate of deflection of the inboard flaps 31 and outboard flaps 39 differ and the gearing of the flap controls is adjusted so that any change in power setting or any change in mean flap angle results in little or no trim change or requirement for complementary pitch control input.

The flap 31,39 is such that it can be set with reflex, i.e. it can be rotated upward, reducing the lift coefficient of the wing. This enables the wing incidence in relation to the planing hull to be set for optimum take-off performance, and using reflex, the attitude of the hull in cruising flight to be set so that the knuckles 11 and chines 4 are substantially parallel to aerodynamic streamlines thereby minimising aerodynamic drag in cruise.

The engine 20 exhausts upward to reduce the noise level and noise print below.

Fuel is contained in the nacelle 19, the main fuselage hull and the sponsons 17.

Although not illustrated, further features may include, for low speed water handling, a thruster unit driven by an electric motor and mounted transversely in the bow to steer the bow at low speed independently of forward speed to help berthing. Either a second thruster unit can be mounted in the stern or a water propeller can be mounted on the submerged lower section 15 of the air rudder 14. This propeller can be driven by an electric motor mounted in an extension of the rudder forward of the rudder hinge line, thus also serving as a control weight balance.

For seasonal operations the undercarriage could be removed and a simple cover plate attached over the cavity normally containing the retracted undercarriage.

Wing and undercarriage retraction systems can use hydraulics with a common drive unit.

I claim:

1. A seaplane hull which can be partially immersed in water and is able to take off from water, the hull having an underside formed as a planing surface defined at each side by a chine and a length dimension from a bow of the hull to an aftermost edge of the underside of the hull more than seven times a maximum width of a narrowest waterline above the chines;

whereas any waterline likely to be encountered by the hull in operation and positioned a distance equal to not less than one-tenth a maximum planing surface beam above the chines has a bow entry angle in plan form, except at and immediately proximate the bow, of less than twenty four degrees.

2. A hull according to claim 1, wherein each chine, viewed in bodyplan section, has a radius of curvature less than 25% of a maximum underside beam, the chine distinguishing the planing surface forming the underside from a topside thereabove.

3. A hull according to claim 1, wherein a underside beam at any station more than 80% of the hull length aft of the bow is less than 20% of a maximum underside beam.

4. A hull according to claim 1, wherein, when the hull is viewed in profile, a plane containing a water line which is parallel to the chine at a first station common to a seaplane centre of gravity and passing through a position not more than 20% of a maximum underside beam higher than either an forwardmost extremity of the chines or, if the chines extend forward of a second station 20% of hull length from the bow, through an intersection of the chine with said second station, that waterline is fair from any position within 5% of hull length of its forwardmost extremity to the first station.

5. A hull according to claim 4, wherein any section of said fair waterline of a length equal to 3% of hull length and located between 10% and 50% of hull length from the forwardmost extremity of that waterline, has less than a 5° change in mean direction over that section.

6. A hull according to claim 1, wherein any waterline aft of a centre of gravity converges toward a central plane, is fair having no discontinuity or abrupt angle or edge along its whole length formed by the chine, the edge or other structure and wherein an aftermost extremity is forward of the aftermost extremity of any waterline thereabove.

7. A hull according to claim 1, wherein an aftermost extremity of the underside is forward of a station 80% of hull length after of the bow.

8. A hull according to claim 1, wherein any waterline has a radius of curvature at a forwardmost extremity of each waterline viewed in planform of less than 2% of hull length.

9. A hull according to claim 1, wherein any waterline has a radius of curvature, at any station between 10% and 50% of hull length measured from the bow of not less than half the length of the hull.

10. A hull according to claim 1, wherein a concave hollow is provided above each chine and is formed by a curved or angled face.

11. A hull according to claim 1, wherein a forwardmost extremity of each chine is at a station not more than 10% of hull length aft of the bow and wherein forward of this station, a topside and the hull underside are faired together so that neither chine nor edge distinguishes topside from hull underside.

12. A seaplane hull which can be partially immersed in water and is able to take off from water, the hull having an underside formed as a planing surface defined at each side by a chine and a length dimension from a bow of the hull to an aftermost edge of the underside of the hull more than seven times a maximum width of a narrowest waterline above the chines;

whereas any waterline likely to be encountered by the hull in operation and positioned a distance equal to not less than one-tenth a maximum planing surface beam above the chines has a bow entry angle in plan form, except at and immediately proximate the bow, of less than twenty four degrees; and wherein a concave hollow is provided above each chine and is formed by a curved or angled face.

13. A seaplane hull which can be partially immersed in water and is able to take off from water, the hull having an underside formed as a planing surface defined at each side by a chine and a length dimension from a bow of the hull to an aftermost edge of the underside of the hull more than seven times a maximum width of a narrowest waterline above the chines;

whereas any waterline likely to be encountered by the hull in operation and positioned a distance equal to not less than one-tenth a maximum planing surface beam above the chines has a bow entry angle in plan form, except at and immediately proximate the bow, of less than twenty four degrees; and wherein a forwardmost extremity of each chine is at a station not more than 10% of hull length aft of the bow and wherein forward of this station, a topside and the hull underside are faired together so that neither chine nor edge distinguishes topside from hull underside.

* * * * *